(12) United States Patent
Koyanagi et al.

(10) Patent No.: US 8,885,597 B2
(45) Date of Patent: Nov. 11, 2014

(54) RADIO COMMUNICATION SYSTEM AND COMMUNICATION METHOD

(75) Inventors: Kenji Koyanagi, Tokyo (JP); Hisashi Futaki, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 650 days.

(21) Appl. No.: 12/419,557

(22) Filed: Apr. 7, 2009

(65) Prior Publication Data

US 2009/0257398 A1    Oct. 15, 2009

(30) Foreign Application Priority Data

Apr. 9, 2008 (JP) .................................. 2008-101864

(51) Int. Cl.
*H04W 4/00* (2009.01)
*H04W 48/18* (2009.01)
*H04W 88/10* (2009.01)

(52) U.S. Cl.
CPC .............. *H04W 48/18* (2013.01); *H04W 88/10* (2013.01)
USPC ........................................................ 370/331

(58) Field of Classification Search
USPC ......... 370/203, 204–215, 229–253, 310–337, 370/395.3, 395.4, 395.41, 395.42, 395.5, 370/395.52, 431–529
See application file for complete search history.

(56) References Cited

U.S. PATENT DOCUMENTS

| | | | |
|---|---|---|---|
| 2005/0070280 A1 | 3/2005 | Jung et al. | |
| 2005/0239497 A1* | 10/2005 | Bahl et al. | 455/552.1 |
| 2006/0073827 A1* | 4/2006 | Vaisanen et al. | 455/436 |
| 2006/0092883 A1* | 5/2006 | Lee et al. | 370/332 |
| 2007/0116012 A1* | 5/2007 | Chang et al. | 370/395.52 |
| 2007/0293224 A1 | 12/2007 | Wang et al. | |
| 2008/0031188 A1* | 2/2008 | Magnusson et al. | 370/329 |
| 2010/0240355 A1* | 9/2010 | Nerst et al. | 455/422.1 |

FOREIGN PATENT DOCUMENTS

| | | |
|---|---|---|
| CN | 1720756 A | 1/2006 |
| EP | 0 929 203 A2 | 7/1999 |
| JP | H7-46650 | 2/1995 |
| JP | H10-126845 | 5/1998 |
| JP | H10-145843 | 5/1998 |
| JP | 2001-054168 | 2/2001 |

(Continued)

OTHER PUBLICATIONS

3GPP TS 36.300 V8.3.0 (Dec. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8).

Office Action dated Jan. 11, 2012 received from the Japanese Patent Office from related Japanese Application No. 2008-101864, together with a partial English-language translation.

(Continued)

*Primary Examiner* — Jung-Jen Liu
(74) *Attorney, Agent, or Firm* — Scully, Scott, Murphy & Presser, P.C.

(57) ABSTRACT

A radio communication system includes a plurality of base stations with supporting a plurality of radio access schemes. Two or more base stations support a predetermined radio access scheme in common. A mobile station makes initial connection to one of the two or more base stations according to the predetermined radio access scheme, to allow communication with the one base station.

8 Claims, 5 Drawing Sheets

(56) References Cited

FOREIGN PATENT DOCUMENTS

| | | |
|---|---|---|
| JP | 2006-512827 | 4/2006 |
| JP | 2006-173778 | 6/2006 |
| JP | 2006-311460 | 11/2006 |
| JP | 2007-150709 A | 6/2007 |
| JP | 2007-151059 | 6/2007 |
| WO | WO 2004/057899 A1 | 7/2004 |
| WO | WO 2004/091244 A1 | 10/2004 |
| WO | WO 2005/109942 A1 | 11/2005 |
| WO | 2006/106561 A1 | 10/2006 |

OTHER PUBLICATIONS

Chinese Office Action dated May 6, 2013 issued in CN 200910134909.5.

Japanese Office Action dated Sep. 26, 2013 received from the Japanese Patent Office in related case JP2012-149616 together with partial translation.

Office Action dated Jul. 4, 2012 received from the Chinese Patent Office from related Chinese Application No. 2009-10134909.5.

* cited by examiner

RADIO COMMUNICATION SYSTEM AND COMMUNICATION METHOD

BACKGROUND OF THE INVENTION

1. Field of the Invention

This application is based upon and claims the benefit of priority from Japanese Patent Application No. 2008-101864, filed on Apr. 9, 2008, the disclosure of which is incorporated herein in its entirety by reference.

The present invention relates to a radio communication system including a base station and a mobile station and, more particularly, to a communication method, a base station, and a mobile station in the system.

2. Description of the Related Art

Currently, various radio transmission schemes, such the third-generation mobile telephone (3G), standard specification for broadband radio access (WiMAX: Worldwide Interoperability for Microwave Access), and standard specification for wireless LAN (WiFi: Wireless Fidelity), have been proposed and are in practical use. However, these different technologies provide different transmission rates and different coverages. Since the transmission rate and coverage are in a tradeoff relationship in general, it is impossible to achieve a high transmission rate and wide-area coverage at the same time with a single radio transmission system. Therefore, there are some cases where an appropriate radio transmission scheme (RAT: radio access technology) is employed according to various circumstances, with the result that cells using different radio transmission schemes are adjacent to each other. For such a radio communication system in which a plurality of radio transmission schemes coexist, several handover techniques are proposed that can be used when a radio terminal capable of operating with both of these radio transmission schemes moves from a cell using one of the radio transmission schemes to a cell using another one of the radio transmission schemes.

For example, in a mobile communication system disclosed in Japanese Patent Application Unexamined Publication No. 2001-54168 (JP2001-54168), a mobile terminal receives radio signals of all communication systems (radio transmission schemes) that the mobile terminal can use, identifies the type of each communication system and also calculates the quality of service (QoS), from the respective signals' frequencies, and then reports these results to a base station (source base station) the mobile terminal is currently communicating with. When the mobile terminal is notified from the network side of a target base station to switch to in response to the report, the mobile terminal secures a radio link with each of the source base station and the target base station and then switches to the target-side radio transmission scheme.

Moreover, according to the Inter RAT handover described in 3GPP TS 36.300 V8.3.0 (2007-12), a target system provides information regarding its RAT (including the radio resource structure, target cell system information, and the like) to a mobile terminal via a currently communicating source system, thus enabling the mobile terminal to switch to the target system's RAT.

However, according to the method in which a mobile station identifies the type of a signal source's radio transmission scheme based on the frequency of a received downlink radio signal, the type of a radio transmission scheme cannot be identified from a frequency in use, in a system, such as a cognitive radio system, where a plurality of radio transmission schemes may use available frequencies.

Moreover, in a case where a plurality of radio access schemes coexist in a single radio communication system such as a wireless LAN (IEEE 802.11), in which IEEE 802.11a/IEEE 802.11g using multi-carrier Orthogonal Frequency Division Multiplexing (OFDM) and IEEE 802.11b using a single carrier coexist, a radio access scheme cannot be identified from a frequency in use, because IEEE 802.11g and IEEE 802.11b use the same frequency.

Another possible method for identifying a radio access scheme is that a mobile station receives a common control signal periodically transmitted by a base station and, based on the result of demodulating the signal, identifies the radio access scheme used by this base station. However, according to this method, since the mobile station does not identify the radio access scheme of a target base station until the mobile station receives a common control signal, a delay of about twice an interval between common control signal transmissions, or longer, may occur, causing a delay in handover processing, for example.

SUMMARY OF THE INVENTION

Accordingly, an object of the present invention is to provide a radio communication system and communication method that can reduce a delay at the time of initial connection.

According to the present invention, a radio communication system includes a plurality of base stations with supporting a plurality of radio access schemes, wherein two or more base stations support a predetermined radio access scheme in common, wherein a mobile station makes initial connection to one of the two or more base stations according to the predetermined radio access scheme, to allow communication with the one base station.

According to the present invention, a communication method in a radio communication system comprising a plurality of base stations with supporting a plurality of radio access schemes, includes: two or more base stations supporting a predetermined radio access scheme in common; and a mobile station making initial connection to one of the two or more base stations according to the predetermined radio access scheme, to allow communication with the one base station.

According to the present invention, a base station in a radio communication system supporting a plurality of radio access schemes, includes: a radio transceiver; a storage section storing at least one radio access scheme supported in the base station, wherein said at least one radio access scheme includes a predetermined radio access scheme which is common with another base station; and a response sending section for sending a response to initial connection received from a mobile station back to the mobile station, wherein the initial connection is received in the predetermined radio access scheme, wherein the response includes information indicating one of said at least one radio access scheme which is used to communicate with the mobile station.

According to the present invention, a mobile station in a radio communication system comprising a plurality of base stations with supporting a plurality of radio access schemes, wherein two or more base stations support a predetermined radio access scheme in common, includes: an initial connection section for making initial connection to a base station using a predetermined radio access scheme; and a radio communication section for communicating with the base station according to a radio access scheme designated by the base station, which is included in a response to the initial connection received from the base station.

According to the present invention, it is possible to reduce a delay at the time of initial connection.

DETAILED DESCRIPTION OF THE PREFERRED EMBODIMENTS

1. Exemplary Embodiment

In a radio communication system according to an exemplary embodiment of the present invention, it is assumed that at least one of a plurality of different radio access schemes is supported in each cell, and that a mobile station has a radio transceiver capable of performing communication by using at least one of these radio access schemes. Hereinafter, to describe a method for identifying a radio access scheme according to the present invention, a description will be given of handover processing performed when a mobile station in communication moves between cells in which difference radio access schemes are supported, as an example. According to the present invention, fast handover can be achieved because the use of a common radio access scheme eliminates the necessity for a mobile station to identify a radio access scheme supported by a handover-target base station before handover processing is started. Further, even in a case where there is a common radio access scheme in a certain area (for example, the carrier frequency band, the area that a network uses for terminal location management, or the like), fast handover can also be achieved because a mobile station can identify a radio access scheme supported by a handover-target base station before handover processing is started. Note that the present invention is applicable not only to a case of handover processing but also to a case where a mobile station located in a certain cell initially connects to the base station covering this cell.

Figure 1:
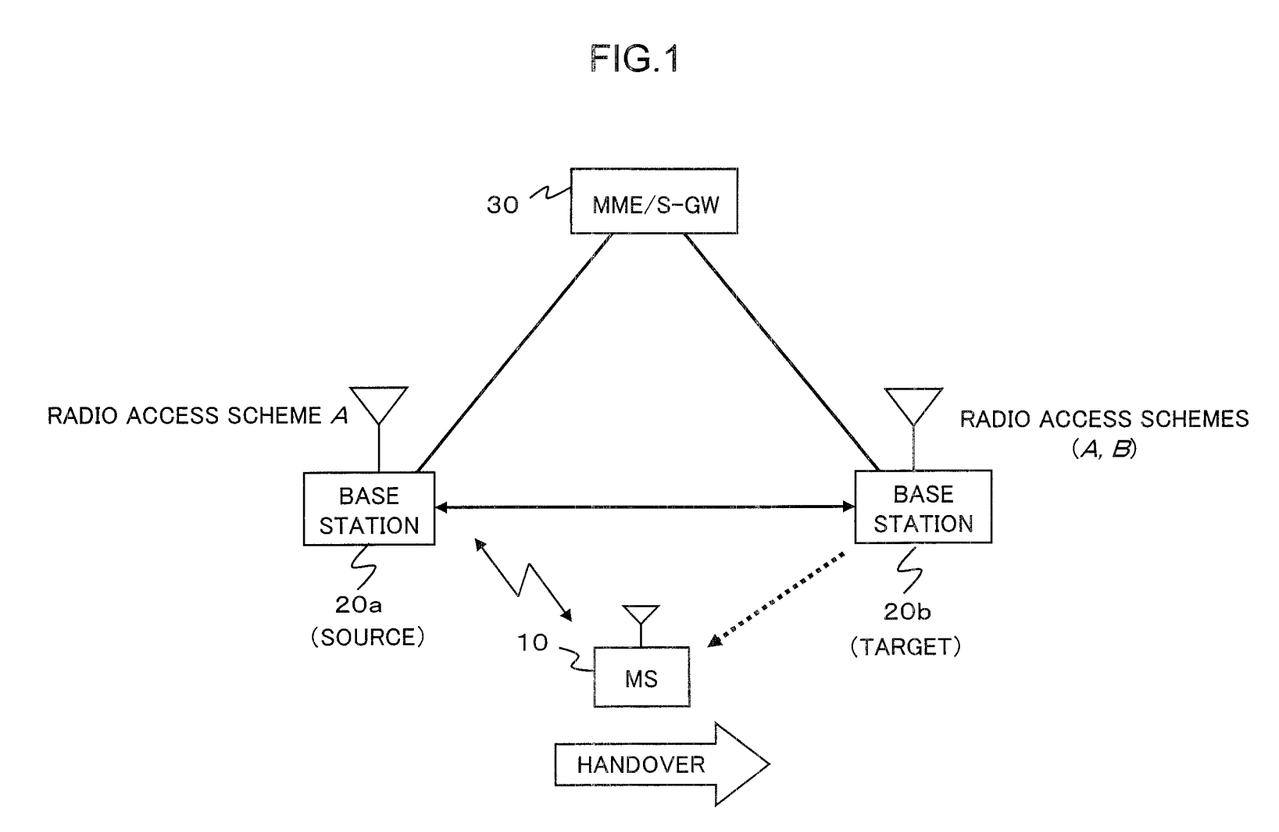
FIG. 1 is a diagram of a system structure to describe a handover in a radio communication system according to an exemplary embodiment of the present invention.

FIG. 1 is a diagram of a system structure to describe a handover in the radio communication system according to the present exemplary embodiment of the present invention. For simplicity of description, assumed here is a radio communication system in which two different radio access schemes A and B are supported on the same radio transmission scheme.

Examples of the radio communication system in which different radio access schemes are supported on the same radio transmission scheme are as follows: a system in which two types of base stations coexist, for example, one supporting a single-carrier scheme and the other supporting a multi-carrier scheme; and a system such as a radio LAN (IEEE 802.11) as mentioned earlier in which the radio access scheme of IEEE 802.11a/802.11g using multi-carrier OFDM and the radio access scheme of IEEE 802.11b using a single carrier coexist.

Here, it is assumed that a base station 20a supports the radio access scheme A and a base station 20b supports the radio access schemes A and B, and that the radio access scheme A is used as a common radio access scheme for initial connection. However, the present invention is not limited to this. Each base station may support two or more radio access schemes, with a specified one of these schemes being assigned as a common radio access scheme.

It is also assumed that the base stations 20a and 20b are connected to the same mobility management entity/serving gateway (MME/S-GW) 30. Moreover, it is assumed that a mobile station 10 is capable of performing communication by using both of the radio access schemes A and B. Additionally, if the mobile station 10 moves and changes a base station to connect to from the base station 20a to the base station 20b, the base station 20a serves as a handover-source base station and the base station 20b serves as a handover-target base station.

In the radio communication system according to the present exemplary embodiment, a common radio access scheme is predetermined, which is common either to all the base stations in the same radio transmission system, to those base stations which are located in a predetermined area of the same radio transmission system, or to those base stations which use the same frequency band in the same radio transmission system. Therefore, before handover, the mobile station 10 can get access to the target base station 20b owing to the common radio access scheme and thus can acquire knowledge of an uplink radio access scheme supported by this target base station 20b. Incidentally, conceivable examples of the above-mentioned predetermined area include a tracking area (TA) and a public land mobile network (PLMN). Moreover, as a conceivable example of the same frequency band, if a single radio transmission scheme simultaneously supports a frequency band A (e.g., 800 MHz band), a frequency band B (e.g., 1.5 GHz band), and a frequency band Z (e.g., 2.1 GHz band), then a radio access scheme is used in common in these frequency bands.

In the present exemplary embodiment, a case will be illustrated as an example where a radio access scheme used when a mobile station proceeds to initial access to a target base station is a predetermined common radio access scheme that is common to all the base stations in the same radio communication system, and where neither areas nor frequency bands vary in the system. If areas and/or frequency bands vary in the same radio communication system for example, a mobile station identifies an area and/or a frequency band, thereby identifying a radio access scheme for initial access, which is predetermined in each area and in each frequency band.

Hereinafter, using a radio communication system proposed in Third Generation Partnership Project (3GPP) Long Term Evolution (LTE) as an example, a detailed description will be given of an example of the present invention in which the method for identifying a radio access scheme according to the present invention is applied to handover processing. In this case, a base station is sometimes denoted as eNB, and a mobile station is sometimes denoted as UE. Additionally, "handover," "uplink," and "downlink" will be abbreviated as "HO," "UL," and "DL," respectively, where appropriate.

2. Example

2.1) Handover Procedure

Figure 2:
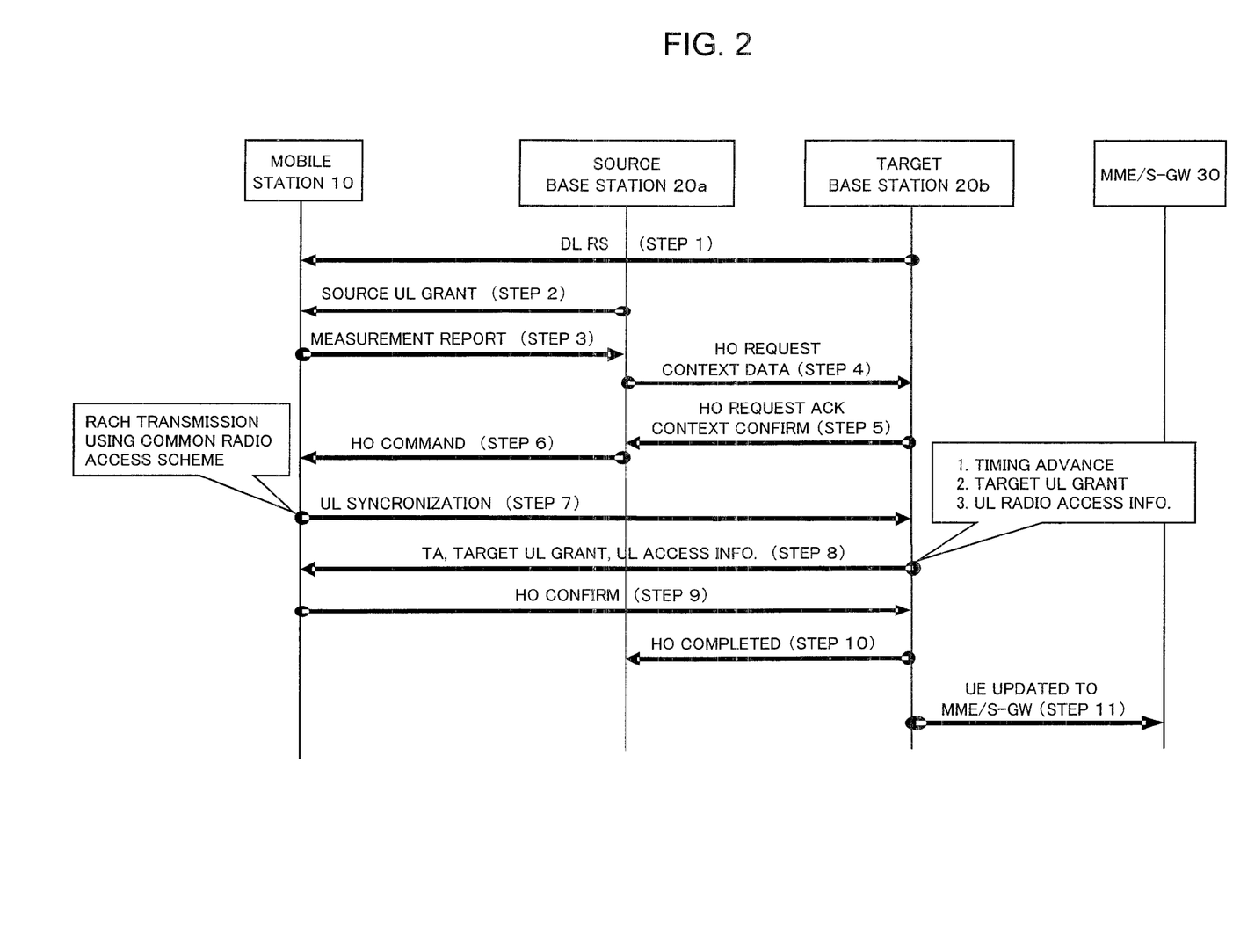
FIG. 2 is a sequence diagram to describe an inter-base station handover in a radio communication system according to an example of the present invention.

FIG. 2 is a sequence diagram to describe an inter-base station handover in a radio communication system according to an example of the present invention. According to the present example, a mobile station 10 can obtain uplink radio access information (UL Access Info) of a target base station 20b by RACH transmission (which is also called random access, initial access, or initial connection) to the target base station 20b according to a predetermined common radio access scheme, whereby the mobile station 10 can determine an uplink (UL) radio access scheme supported by the target base station 20b before handover. The mobile station 10 can perform RACH transmission using the common radio access scheme from the moment that the mobile station 10 identifies the existence of the target base station 20b and receives a handover (HO) command. Accordingly, the mobile station 10 does not need to perform identification of a radio access scheme supported by the target base station 20b before handover, resulting in fast handover. Details thereof will be described hereinafter.

First, in Step 1, the target base station 20b transmits a reference signal for downlink channel estimation (DL RS), and the mobile station 10 receives the signal. In this reference signal, signal sequences (e.g., scrambling codes) each uniquely assigned to each base station are multiplexed.

In Step 2, the source base station 20a transmits to the mobile station 10 source base station scheduling information (UL allocation or Source UL Grant), which indicates an uplink resource allocated to the mobile station 10 in the source cell.

In Step 3, for a handover between base stations to be carried out, the mobile station 10 transmits to the source base station 20a a measurement report (Measurement Report) on a neighboring cell situated near the source cell in which the mobile station 10 is currently located.

In Step 4, the source base station 20a transmits the quality of service (QoS), profile, and the like of the mobile station 10 as a HANDOVER REQUEST message (Context Data) to the target base station 20b.

In Step 5, with respect to the mobile station 10, the target base station 20b determines whether or not the handover request can be accepted, and transmits to the source base station 20a a HANDOVER REQUEST ACKNOWLEDGE message (Context Confirm), which is handover acceptance information indicating the result of the determination, with including transfer information which contains radio resource information about the time and frequency resources allocated for random access to the target base station 20b.

In Step 6, the source base station 20a transmits to the mobile station 10 a handover start command (HANDOVER COMMAND or HO Command), which is a control signal including the handover acceptance information and the transfer information containing the radio resource information for random access.

In Step 7, the mobile station 10, after receiving the control signal (HO Command) from the source base station 20a, gets access to the target base station 20b by transmitting a random access signal (UL Synchronization) through RACH (Random Access Channel), which is an uplink channel. In this event, the mobile station 10 generates and transmits this random access signal (UL Synchronization) in accordance with a common radio access scheme predetermined among part or all of the base stations.

In Step 8, the target base station 20b transmits uplink radio access information (UL Access Info) on its own cell (target cell), as well as a transmission timing adjustment value (TA: Timing Advance) and uplink scheduling information (Target UL Grant). Thereby, the mobile station 10 can identify an uplink radio access scheme supported by the target base station 20b.

In Step 9, the mobile station 10 adjusts its transmission timing in accordance with the transmission timing adjustment value (TA) and transmits control information (HO Confirm) to the target base station 20b by using the allocated uplink resource, thus notifying that the mobile station 10 has been handed over.

In Step 10, the target base station 20b transmits a control signal (RELEASE RESOURCE or HO Completed) to the source base station 20a. In Step 11, the target base station 20b notifies the connected MME/S-GW 30 that the mobile station 10 has moved into the cell under its management through inter-base station handover (UE updated to MME/S-GW), whereby the inter-base station handover operation is completed.

As described above, a radio access scheme common to base stations is predetermined. A mobile station performs RACH transmission by using this common radio access scheme, whereby the mobile station can identify a handover target's radio access scheme at high speed. Thus, a delay in handover can be reduced.

2.2) Mobile Station

Figure 3:
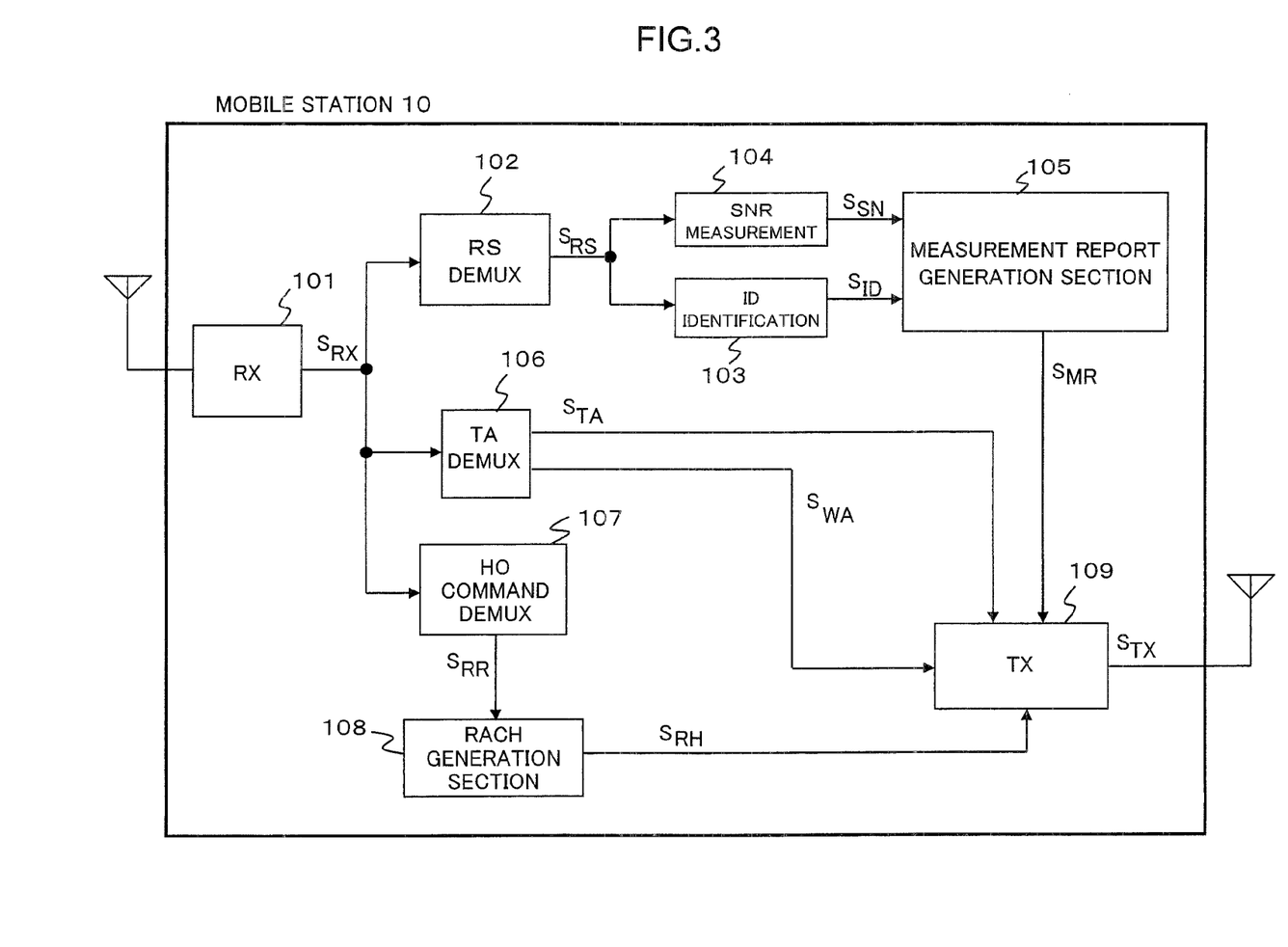
FIG. 3 is a block diagram showing a functional configuration of a mobile station in the radio communication system according to the present example.

FIG. 3 is a block diagram showing a functional configuration of a mobile station in the radio communication system according to the present example. Note that FIG. 3 shows only those functions which are related to the sequence shown in FIG. 2.

A reception section 101 of the mobile station 10 receives a downlink signal from a base station (the base station 20a or 20b in the present example) and calculates the autocorrelation value during a guard interval or the like, whereby establishing downlink synchronization. After the establishment of downlink synchronization, the reception section 101 outputs the received signal $S_{RX}$ to each of a RS demultiplexing section 102, a TA demultiplexing section 106, and a HO Command demultiplexing section 107. Note that the reception section 101 is capable of performing reception operation according to any of a radio access scheme supported by the source base station 20a that the mobile station 10 is currently connecting to and a radio access scheme supported by the target base station 20b as described later.

The RS demultiplexing section 102 receives the received signal $S_{RX}$ as input, demultiplexes a reference signal $S_{RS}$ off, and outputs the reference signal $S_{RS}$ to each of an ID identification section 103 and a SNR measurement section 104. The ID identification section 103 identifies from the downlink reference signal $S_{RS}$ the ID (base station identifier) of the base station that is the originator of the reference signal $S_{RS}$, and outputs a base station ID signal $S_{ID}$ to a Measurement Report generation section 105. If the base station covers a plurality of sectors, one of those IDs which indicate these sectors respectively is used as the base station identifier. Incidentally, a sector is also referred as "cell," in which case a cell ID (Physical Cell Identity) is used as the identifier. The SNR measurement section 104 measures the reception signal-to-noise ratio (SNR) from the downlink reference signal $S_{RS}$ and outputs a SNR measurement signal $S_{SN}$ to the Measurement Report generation section 105.

The Measurement Report generation section 105 generates Measurement Report $S_{MR}$ based on the base station ID signal $S_{ID}$ and SNR measurement signal $S_{SN}$. In the present example, the Measurement Report generation section 105 generates Measurement Report $S_{MR}$ on a neighboring cell (a candidate for target cell, which is the cell of the base station 20b in the present example) situated near the cell of the base station 20a in which the mobile station 10 is currently located.

Thus, the Measurement Report $S_{MR}$ on the cell of the target base station 20b is output to a transmission section 109 and then transmitted to the source base station 20a (see Step 3 in FIG. 2).

The TA demultiplexing section 106 demultiplexes a TA signal $S_{TA}$ and an UL radio access received signal $S_{WA}$ from the received signal $S_{RX}$ (see Step 8 in FIG. 2) and outputs the TA signal $S_{TA}$ to the transmission section 109 and the UL radio access received signal $S_{WA}$ also to the transmission section 109. The TA signal $S_{TA}$ is an uplink transmission timing adjustment value designated by a base station and enables synchronization to be established and data to be communicated between a mobile station and the base station.

The HO Command demultiplexing section 107 demultiplexes a HO Command signal from the received signal $S_{RX}$ and further extracts from the HO Command signal a RACH resource signal $S_{RR}$, which is included in the HO Command signal as transfer information, and outputs the RACH resource signal $S_{RR}$ to a RACH generation section 108. The RACH resource signal $S_{RR}$ includes information indicating the time and frequency resource allocated for random access to the target base station 20b.

Based on the resource indicated by the RACH resource signal $S_{RR}$, the RACH generation section 108 generates a random access signal $S_{RH}$ in accordance with the predetermined common radio access scheme.

The transmission section 109 modulates the above-described Measurement Report $S_{MR}$ in accordance with a radio access scheme supported by the source base station 20a and transmits the Measurement Report $S_{MR}$ to the source base station 20a at the timing according to the TA signal $S_{TA}$. Moreover, the transmission section 109 modulates the random access signal $S_{RH}$ in accordance with the common radio access scheme and transmits the random access signal $S_{RH}$ to the target base station 20b at the timing and frequency according to the RACH resource signal $S_{RR}$. Furthermore, the transmission section 109 can transmit a control signal and data to the target base station 20b in accordance with a radio access scheme designated by the UL radio access received signal $S_{WA}$.

Note that the above-described handover-related functions of the mobile station 10 can also be implemented by executing a program on a program-controlled processor such as a CPU.

2.3) Base Station

Figure 4:
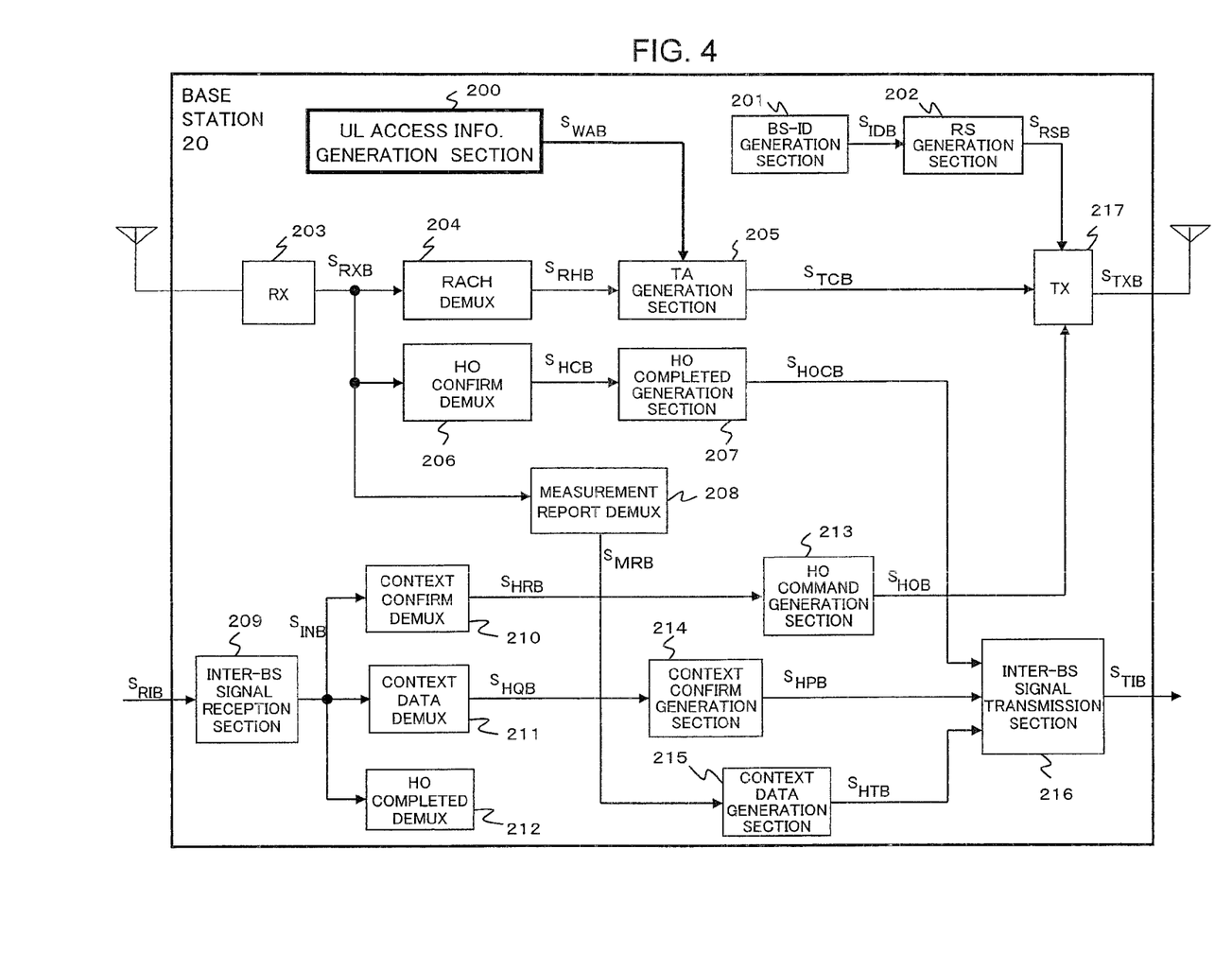
FIG. 4 is a block diagram showing a functional configuration of a base station in the radio communication system according to the present example.

FIG. 4 is a block diagram showing a functional configuration of a base station in the radio communication system according to the present example. Since each of the base stations 20a and 20b in the present example has a configuration similar to that shown in FIG. 4, "base station 20" will be used in the following description. Additionally, FIG. 4 also shows only those functions which are related to the sequence shown in FIG. 2.

The base station 20 is provided with an UL Access Info generation section 200, a base station ID generation section 201, and a RS generation section 202. In the present example, the UL Access Info generation section 200 outputs to a TA generation section 205 information $S_{WAB}$ indicating a radio access scheme allocated beforehand to this base station 20. If the UL Access Info generation section 200 stores a plurality of predetermined radio access schemes, the UL Access Info generation section 200 may be configured to select one of these radio access schemes and transmit the selected one to the TA generation section 205. Moreover, if a cell structure is such that a plurality of cells are formed under a single base station, it is also possible to change a radio access scheme from one cell to another.

The base station ID generation section 201 generates a base station ID signal $S_{IDB}$ indicating the base station identifier and outputs the base station ID signal $S_{IDB}$ to the RS generation section 202. The RS generation section 202 generates a reference signal $S_{RSB}$ by using a signal sequence corresponding to the base station ID signal $S_{IDB}$ and outputs the reference signal $S_{RSB}$ to a transmission section 217. Accordingly, by receiving such a reference signal $S_{RSB}$, each mobile station can identifies the base station covering a neighboring cell.

A reception section 203 of the base station 20 receives an uplink signal $S_{TX}$ from a mobile station and outputs the received signal $S_{RXB}$ to each of a RACH demultiplexing section 204, a HO Confirm demultiplexing section 206, and a Measurement Report demultiplexing section 208. The reception section 203 is capable of communication according to one radio access scheme or a plurality of radio access schemes, and a specified one of the radio access schemes is used for random access from a mobile station to this base station 20. For example, in LTE, the use of a single-carrier scheme seems to be preferable if the reception section 203 is capable of communication according to only one radio access scheme.

The RACH demultiplexing section 204 demultiplexes a random access signal $S_{RHB}$ from the received signal $S_{RXB}$ and outputs the random access signal $S_{RHB}$ to a TA generation section 205.

The TA generation section 205 generates a TA transmission signal $S_{TCB}$ for adjusting the transmission timing of the mobile station so that uplink synchronization will be established between the mobile station and this base station 20 based on the timing at which the random access signal $S_{RHB}$ from the mobile station was received, and outputs the generated TA transmission signal $S_{TCB}$ along with the information $S_{WAB}$ indicating the radio access scheme input from the UL Access Info generation section 200, collectively as a TA transmission signal $S_{TCB}$, to the transmission section 217 (see Step 8 in FIG. 2).

The HO Confirm demultiplexing section 206 demultiplexes from the received signal $S_{RXB}$ a HO Confirm signal $S_{HCB}$, which is a signal indicating the establishment of synchronization between a mobile station and a target base station, and outputs the HO Confirm signal $S_{HCB}$ to a HO Completed generation section 207. The HO Completed generation section 207, upon receipt of the HO Confirm signal $S_{HCB}$ as input, generates a HO Completed signal $S_{HOCB}$, which indicates the completion of preparation for handover, and outputs the HO Completed signal $S_{HOCB}$ to an inter-base station signal transmission section 216. The HO Completed signal $S_{HOCB}$ is a signal to be notified from a target base station to a source base station.

The Measurement Report demultiplexing section 208 demultiplexes Measurement Report transmitted by the mobile station from the received signal $S_{RXB}$ and outputs the Measurement Report as a received Measurement Report signal $S_{MRB}$ to a Context Data generation section 215.

An inter-base station signal reception section 209 receives a signal $S_{RIB}$ from another base station and outputs an inter-base station control signal $S_{INB}$ to each of a Context Confirm demultiplexing section 210, a Context Data demultiplexing section 211, and a HO Completed demultiplexing section 212.

The Context Confirm demultiplexing section 210 demultiplexes a Context Confirm signal $S_{HRB}$ from the inter-base station control signal $S_{INB}$ and outputs the Context Confirm signal $S_{HRB}$ to a HO Command generation section 213.

The Context Data demultiplexing section 211 demultiplexes a Context Data signal $S_{HQB}$ from the inter-base station control signal $S_{INB}$ which is received from a source base station, and outputs the Context Data signal $S_{HQB}$ to a Context Confirm generation section 214. The Context Data signal $S_{HQB}$ is a signal indicating a request to hand over a mobile station from a source base station to a target base station.

The HO Command generation section 213 generates a HO Command signal $S_{HOB}$ from the Context Confirm signal $S_{HRB}$ and outputs the HO Command signal $S_{HOB}$ to the transmission section 217. The HO Command signal $S_{HOB}$ is a signal to be transmitted from a source base station to a mobile station.

The Context Confirm generation section 214, upon receipt of the Context Data signal $S_{HQB}$, determines whether or not to permit a handover of the mobile station. The Context Confirm generation section 214 then generates a Context Confirm signal $S_{HPB}$ that includes, as part thereof, the result of this determination and transfer information containing radio resource information for random access to this base station 20, and then outputs the Context Confirm signal $S_{HPB}$ to the inter-base station signal transmission section 216.

In the present example, if the base station 20 is the target base station 20b, the Context Confirm signal $S_{HPB}$, which includes handover acceptance information and the like, is transmitted to the source base station 20a through the inter-base station signal transmission section 216 (see Step 5 in FIG. 2).

If the base station 20 is the source base station 20a, the Context Confirm demultiplexing section 210 demultiplexes the Context Confirm signal $S_{HRB}$ from the inter-base station control signal $S_{INB}$, and the HO Command generation section 213 generates the HO Command signal $S_{HOB}$ from the Context Confirm signal $S_{HRB}$. The HO Command signal $S_{HOB}$ is then transmitted to the mobile station in question through the transmission section 217 (see Step 6 in FIG. 2).

The Context Data generation section 215 receives the received Measurement Report signal $S_{MRB}$ as input and generates, as a Context Data signal $S_{HTB}$, information for requesting that the mobile station be handed over from the source base station to the target base station. If the base station 20 is the source base station 20a, the Context Data signal $S_{HTB}$ is notified to the target base station 20b (see Step 4 in FIG. 2).

As described above, when the inter-base station signal transmission section 216 receives any one of the HO Completed signal $S_{HOCB}$, Context Confirm signal $S_{HPB}$, and Context Data signal $S_{HTB}$ as input, the inter-base station signal transmission section 216 transmits the input signal to another base station.

When the transmission section 217 receives any one of the downlink RS signal $S_{RSB}$, TA transmission signal $S_{TCB}$, and HO Command signal $S_{HOB}$ as input, the transmission section 217 transmits the input signal to a mobile station as a downlink signal $S_{TXB}$.

Incidentally, when the HO Completed demultiplexing section 212 has demultiplexed a HO Completed signal from the inter-base station control signal $S_{INB}$, and if this HO Completed signal indicates the completion of preparation for a handover of the mobile station, then the handover processing is completed.

Note that the above-described handover-related functions of the base station 20 can also be implemented by executing a program on a program-controlled processor such as a CPU.

2.4) Effect

According to the above-described example of the present invention, even in a case where different base stations support different radio access schemes in a single radio communication system, a mobile station can identify a handover target's radio access scheme by transmitting a signal for initial connection by using a common radio access scheme, without receiving common control information. As a result, it is possible to perform fast handover between base stations without increasing a delay in handover.

3. Specific Example

Figure 5:
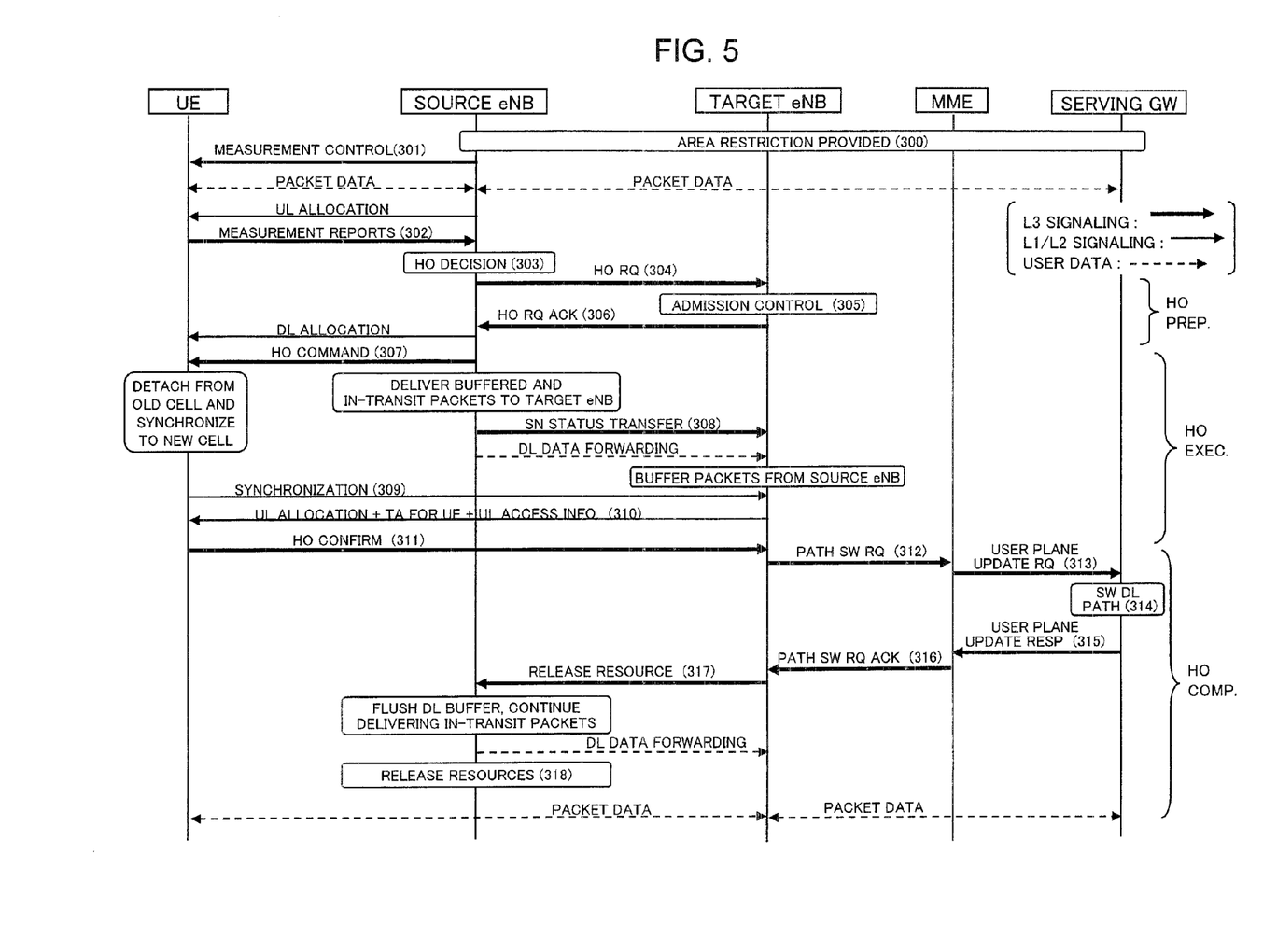
FIG. 5 is a sequence diagram showing a specific example of an intra-MME/S-GW handover according to the example shown in FIG. 2.

FIG. 5 is a sequence diagram showing a specific example of an intra-MME/S-GW handover according to the example shown in FIG. 2. In the following description, it is assumed that MBMS stands for "Multimedia Broadcast and Multicast Service," and that MBSFN stands for "MBMS over a Single Frequency Network."

3.1) Multiple Access

Multiple access technology for the LTE physical layer is based on Orthogonal Frequency Division Multiplexing (OFDM) provided with cyclic prefixes (CPs) in the downlink and is based on OFDM and/or Single Carrier Frequency Division Multiple Access (SC-FDMA) provided with CPs in the uplink. In the uplink, the multiple access scheme(s) can be configured to be cell-specific or user-specific. To support transmission in a paired or unpaired spectrum, two duplex modes are supported: specifically, frequency division duplex (FDD) and time division duplex (TDD) supporting full duplex operation and half-duplex operation.

In order to support smooth handover, the multiple access scheme used for random access is same (that is, any one of OFDM and SC-FDMA) within cells situated in a predetermined area or within all the cells in the same system.

3.2) Control Plane Processing

A handover (HO) procedure is carried out without involvement of the Evolved Packet Core (EPC). That is, preparation messages are directly exchanged between base stations (eNBs). Resource release on the source side in the HO completion phase is triggered by the base station (eNB). In FIG. 5, shown is a basic handover procedure in which neither a MME nor a serving gateway changes. Hereinafter, the intra-MME/S-GW HO procedure will be described in detail with reference to FIG. 5.

Step 300: A UE context in a source eNB contains information regarding a roaming restriction, which is provided either at the time of connection establishment or at the time of the last TA update.

Step 301: The source eNB sets a UE measurement procedure in accordance with the area restriction information. Measurement provided by the source eNB may assist a function of controlling the connection mobility of a UE.

Step 302: A UE is triggered to transmit MEASUREMENT REPORT by a predetermined rule (e.g., system information, specification, etc.). During the measurement procedure, the UE identifies an uplink multiple access scheme used in the target cell, based on a sequence included in a downlink reference signal. The sequence included in the downlink reference signal corresponds to one of the two uplink multiple access schemes, that is, OFDM or SC-FDMA.

Step 303: The source eNB decides whether to perform a handover of the UE, based on the MEASUREMENT REPORT and RRM information.

Step 304: The source eNB issues a HANDOVER REQUEST message to a target eNB and gives information required for handover preparation on the target side (such as UE X2 signaling context reference at the source eNB, UE S1 EPC signaling context reference, target cell ID, $K_{eNB}*$, RRC context including the C-RNTI of the UE in the source eNB, AS-configuration (excluding physical layer configuration), EPS bearer context and physical layer ID of the source cell+ MAC for possible RLF recovery). The UE X2 and UE S1 signaling references enable the target eNB to address the source ENB and EPC. The EPS bearer context includes necessary radio network layer (RNL) and transport network layer (TNL) addressing information, and a QoS profile of the EPC bearer.

Step 305: If the resources can be granted by the target eNB, admission control may be performed by the target eNB in accordance with the received EPS bearer QoS information so that the probability of success in handover is increased. The target eNB sets the required resources in accordance with the received EPS bearer QoS information and reserves C-RNTI and optionally a RACH preamble. An AS-configuration to be used in the target cell can be designated independently (i.e., "establishment"), or can be specified as a difference from an AS-configuration used in the source cell (i.e., "reconfiguration").

Step 306: The target eNB prepares a handover with L1/L2 and transmits HANDOVER REQUEST ACKNOWLEDGE to the source eNB. The HANDOVER REQUEST ACKNOWLEDGE message includes a transparent container to be transmitted to the UE as part of a Handover Command. This container can contain a new C-RNTI, target eNB security algorithm identifier for a selected security algorithm, and some other parameters such as access parameters and SIBs. The HANDOVER REQUEST ACKNOWLEDGE message may also include RNL/TNL information for a forwarding tunnel if necessary.

Note that data forwarding may be started as soon as the HANDOVER REQUEST ACKNOWLEDGE is received by the source eNB or as soon as the transmission of a Handover Command is started in the downlink.

The next steps 307 to 316 described below provide means for avoiding data loss during handover.

Step 307: The source eNB generates HANDOVER COMMAND (RRC message) destined for the UE. The HANDOVER COMMAND includes the transparent container received from the target eNB. The source eNB performs required integrity protection and message encryption. The UE receives the HANDOVER COMMAND including the necessary parameters (e.g., new C-RNTI, target eNB security algorithm identifier, dedicated RACH preamble and its possible expiration time, target eNB SIB, and the like), and executes handover operation by the command of the source eNB. The UE does not need to delay the handover execution in order to deliver a HARQ/ARQ response to the source eNB.

Step 308: The source eNB transmits a SN STATUS TRANSFER message to the target eNB, thereby conveying the uplink PDCP SN receiver status and downlink PDCP SN transmitter status of System Architecture Evolution (SAE) bearers to which Packet Data Convergence Protocol (PDCP) status preservation applies. The uplink PDCP SN receiver status includes at least the PDCP SN of a next expected in-sequence uplink service data unit, UL SDU, (upper window edge) and may further include a list of the PDCP SN of an out-of-sequence UL SDU that is thought to be missing. The missing UL SDU, if any, needs to be retransmitted by the UE in the target cell. The downlink PDCP SN transmitter status indicates the next PDCP SN that the target eNB is to assign to a new SDU having no PDCP SN yet. Note that the source eNB can omit transmitting this message if any of the SAE bearers of the UE should not be treated with PDCP status preservation.

Step 309: After receiving the HANDOVER COMMAND, the UE synchronizes to the target eNB and gets access to the target cell by using the uplink radio access scheme that is set in advance for random access. The access to the target cell is made through RACH. If a dedicated RACH preamble is assigned in the HANDOVER COMMAND, the access operation is carried out following a contention-free procedure. If no dedicated RACH preamble is assigned, the access operation is carried out following a contention-based procedure. The UE extracts a target eNB-specific key and sets the selected security algorithm to be used in the target cell.

Step 310: The network responds with UL allocation, as well as timing advance TA and UL Access Info.

Step 311: When the UE has accessed to the target cell successfully, the UE transmits a HANDOVER CONFIRM message (C-RNTI) and, if necessary, an uplink buffer status report to the target eNB, thereby informing that the handover procedure for the UE is completed. The target eNB verifies the C-RNTI transmitted in the HANDOVER CONFIRM message. Thus, the target eNB can start transmitting data to the UE. Based on further optimization, it is also possible to start downlink data transmission at an earlier stage, subsequent to the step S8.

Step 312: The target eNB transmits a PATH SWITCH message to the MME, thereby notifying that the UE has changed cells.

Step 313: The MME transmits a USER PLANE UPDATE REQUEST message to the serving gateway (S-GW).

Step 314: The serving gateway switches the downlink data path to the target side, whereby U-Plane/TNL resources can be released with respect to the source eNB.

Step 315: The serving gateway transmits a USER PLANE UPDATE RESPONSE message to the MME.

Step 316: The MME confirms the PATH SWITCH message with a PATH SWITCH ACK message.

Step 317: By transmitting RELEASE RESOURCE, the target eNB notifies the source eNB of the success in handover and triggers the release of resources. The timing for the target eNB to transmit this message between the steps S10 and S15 is for further study.

Step 318: Upon receipt of the RELEASE RESOURCE message, the source eNB can release the radio and C-plane-related resources associated with the UE context.

The present invention can be applied to a case where different base stations support different radio access schemes in a 3GPP LTE system, for example. It is needless to say that radio access schemes to which the present invention can be applied are not limited to OFDM and SC-FDMA.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A radio communication system comprising a plurality of base stations each of which supports a plurality of radio access schemes, wherein two or more base stations support a predetermined radio access scheme in common, wherein a mobile station makes initial connection to one of the two or more base stations according to the predetermined radio access scheme, to allow communication with the one base station, wherein the initial connection is an access to the one of the two or more base stations for at least synchronization by random access channel (RACH) transmission of a random access signal using the predetermined radio access scheme and wherein the two or more base stations are those base stations which are located in a predetermined area on a certain radio transmission system, those base stations which use a same frequency band in a certain radio transmission system, or all the base stations in a certain radio transmission system.

2. The radio communication system according to claim 1, wherein, in response to the initial connection, the one base station notifies the mobile station of its supporting radio access scheme.

3. The radio communication system according to claim 1, wherein the mobile station makes the initial connection before handover from another base station to said one base station.

4. The radio communication system according to claim 1, wherein the two or more base stations employ a certain radio transmission system on which at least one radio access scheme including the predetermined radio access scheme is implemented.

5. A communication method in a radio communication system comprising a plurality of base stations each of which supports a plurality of radio access schemes, comprising:

two or more base stations supporting a predetermined radio access scheme in common; and a mobile station making initial connection to one of the two or more base stations according to the predetermined radio access scheme, to allow communication with the one base station, wherein the initial connection is an access to the one of the two or more base stations for at least synchronization by random access channel (RACH) transmission of a random access signal using the predetermined radio access scheme and wherein the two or more base stations are those base stations which are located in a predetermined area on a certain radio transmission system, those base stations which use a same frequency band in a certain radio transmission system, or all the base stations in a certain radio transmission system.

6. The radio communication method according to claim 5, wherein, in response to the initial connection, the one base station notifies the mobile station of its supporting radio access scheme.

7. The radio communication method according to claim 5, wherein the mobile station makes the initial connection before handover from another base station to said one base station.

8. The radio communication method according to claim 5, wherein the two or more base stations employ a certain radio transmission system on which at least one radio access scheme including the predetermined radio access scheme is implemented.

* * * * *